July 21, 1970 D. H. RUMBLE 3,521,241

TWO-DIMENSIONAL DATA COMPRESSION

Original Filed Jan. 3, 1967 5 Sheets-Sheet 1

INVENTOR
DALE H. RUMBLE

BY Joseph J. Connerton
ATTORNEY

July 21, 1970 D. H. RUMBLE 3,521,241

TWO-DIMENSIONAL DATA COMPRESSION

Original Filed Jan. 3, 1967 5 Sheets-Sheet 2

July 21, 1970 D. H. RUMBLE 3,521,241

TWO-DIMENSIONAL DATA COMPRESSION

Original Filed Jan. 3, 1967 5 Sheets-Sheet 4

FIG. 6
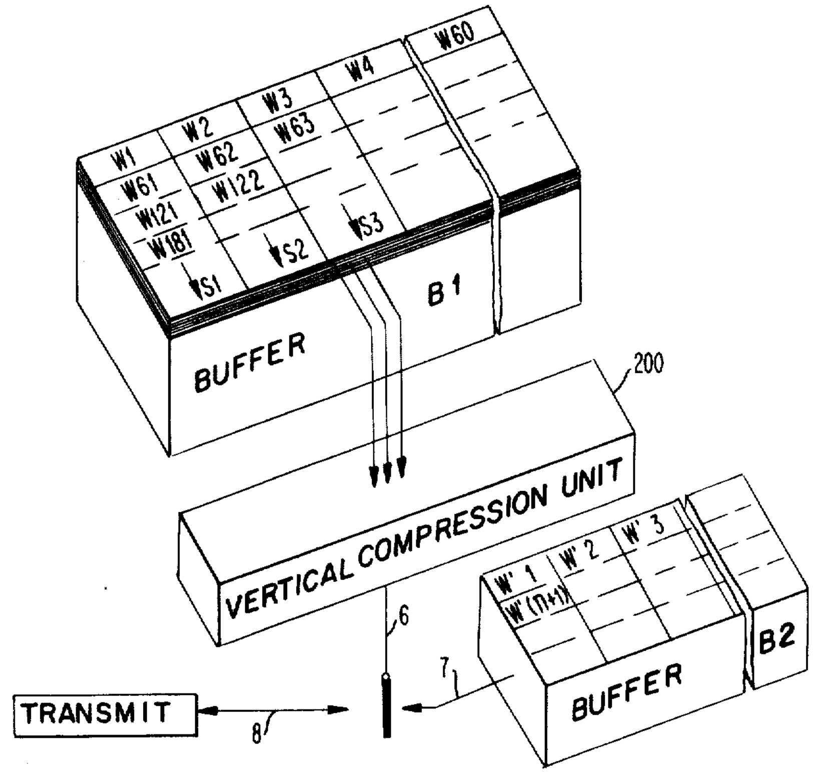
FIG. 7
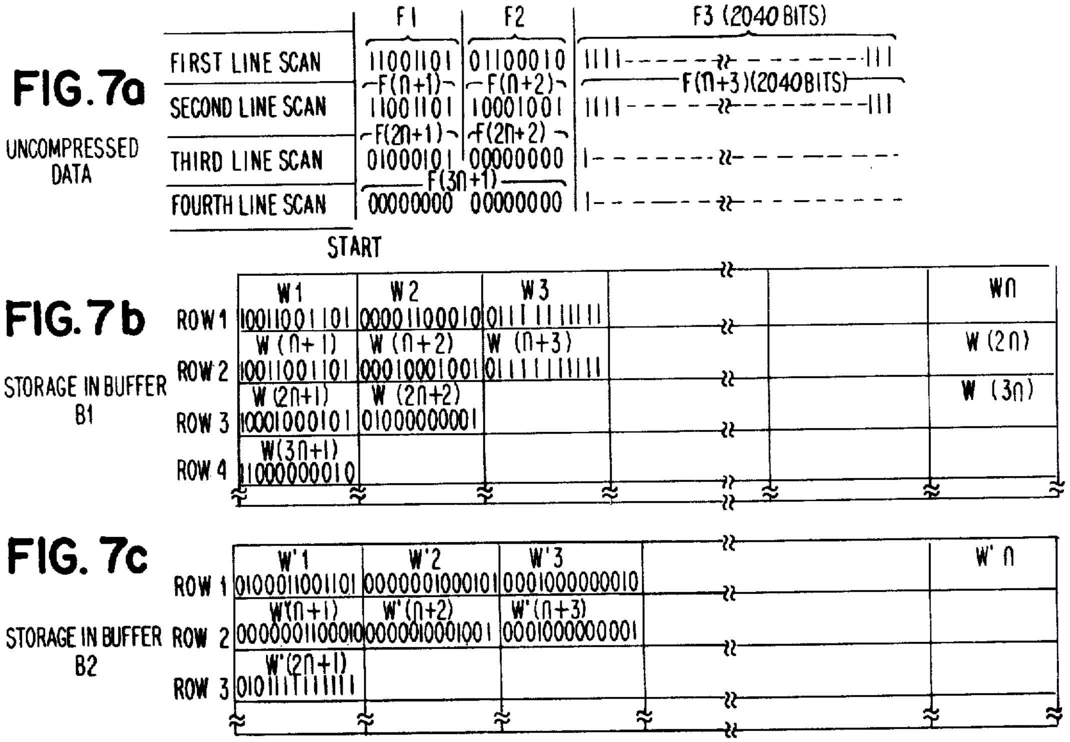
FIG. 7a, FIG. 7b, FIG. 7c

United States Patent Office 3,521,241

Patented July 21, 1970

3,521,241

TWO-DIMENSIONAL DATA COMPRESSION

Dale H. Rumble, Saugerties, N.Y., assignor to International Business Machines Corporation, Armonk, N.Y., a corporation of New York Continuation of application Ser. No. 606,890, Jan. 3, 1967. This application Jan. 14, 1969, Ser. No. 793,235

Int. Cl. G06f *7/00;* H04b *1/64*

U.S. Cl. 340—172.5 32 Claims

ABSTRACT OF THE DISCLOSURE

An apparatus for compressing data in two dimensions, said data having been obtained by unidirectional scans of a document or picture. Data enters a horizontal compression unit where it is run-length encoded, in bit-by-bit fashion, to reduce redundancy which exists along the scan direction. This compressed data is then entered into a buffer where it represents a pseudo-image of the original document. Data is read out of this buffer into a vertical compression unit, where it is compressed on a word-by-word basis to reduce redundancy which existed in a direction transverse to the scan direction.

This application is a continuation of the earlier filed application Ser. No. 606,890, dated Jan. 3, 1967, and now abandoned.

This invention relates to data compression, and more particularly to an apparatus for two-dimensional data compression.

In any system, such as television and facsimile, wherein video data signals are obtained by raster scanning, much redundancy is usually inherent in the data. This redundancy arises from the repetition of continuously white, or continuously black parts of a drawing or picture. In systems such as television, the amount of redundancy is less, since the pictures are moving so that many changes from black to white, or white to black, are present. In an engineering drawing, however, the amount of redundancy tends to be large, as the drawing will comprise large areas of either black or white. Redundancy then is a measure of the repetition of white or black area in a drawing or picture. Data compression refers to any method by which this redundancy is reduced.

Elimination of this redundancy has many advantages, a primary one being the lesser amount of costly storage that is required for compressed data.

Another important advantage is the reduction in transmission time, bandwidth, power, and/or error rate when this compressed data is to be transmitted. If the compression ratio C is defined as the ratio of the average number of bits required to represent a message at the compactor input to the compactor output, when the message is being transmitted, then it can be shown that the transmission time T required for the same transmission channel bandwidth can be reduced to $T/C$ or, alternatively, the bandwidth W can be reduced to $W/C$.

A still further advantage of data compaction is that it can be used to reduce the message error rate. It can be shown that the probability of correctly identifying a signal is exponentially proportional to the signal energy which, if time and bandwidth are the same, is CS, where S is the signal energy for the same data in uncompacted form. Therefore, the probability of a correct decision is exponentially proportional to C. Since the removal of some of the redundancy from the data makes each bit of the remaining data more significant, it may sometimes be desirable to use some of the compaction to increase the signal energy and thus to obtain the desired message reliability.

As has been previously mentioned, the redundancy in video signals exists not only in a horizontal direction but in a vertical direction as well. Previously, there have been schemes, such as run-length encoding, for the compression of data in one dimension. Run-length encoding involves a comparison of data being scanned with that previously scanned. A signal is generated only when there is a change of data, i.e., when there is a change from white to black, or black to white. A counter counts the number of bits which have been compared between each succeeding pair of such changes and, when a change occurs, the contents of the counter at the time of change are presented on the output line of the circuit. In other words, if there is redundancy a compressed word will be generated to indicate the extent of this redundancy; if there is little or no redundancy, the actual bits themselves will comprise the words.

This type of run-length encoding serves to eliminate some of the aforementioned reundancy, but does not produce an overall, or two dimensional reduction of redundancy. Even if a drawing is rotated 90 degrees and scanned again, then subsequently the resulting data is run-length encoded, much hardware would be required to separate and store the resulting information from both scans as the coding and decoding problem would be extremely complex. This, in addition to not being a practical solution, does not provide a maximum overall data compression of the redundancy inherent in a drawing.

Accordingly, it is a primary object of the present invention to obtain a more economical data compression system.

It is a further object to achieve data compression in two dimensions, i.e., in a direction along the line of scanning and in a direction normal to the line of scanning, wherein the document is scanned in only one direction.

It is a still further object of this invention to achieve an improved two-dimensional data compactor, wherein the document is scanned in only one direction, and wherein the amount of data compression is variable.

In accordance with these objects, the data which has been compressed in two dimensions can be stored or directly transmitted. The invention has application in television, but primarily in the reproduction of facsimile or engineering drawings.

Briefly, a document or drawing is scanned, and the resultant data is run-length encoded. This data is then stored in a buffer in such a way that it represents a pseudo-image of the original document. It is a pseudo-image in that the arrangement in the buffer may be random, provided that the data that is stored is controlled so that, when it is read out, the readout consists of corresponding portions of adjacent horizontal lines of the original document. Thus, as one is reading out of the first buffer, regardless of the physical position of the data, one is literally examining a pseudo-image of the document. The data is read out of this first buffer and re-encoded, in order to eliminate vertical redundancy which exists between adjacent lines of scan. Thus, there is a compression of already compressed data, providing a maximum efficiency of overall compression. This twice compressed data can be stored in a second buffer or can be transmitted directly. Since the data has been much reduced, the amount of band-width required to transmit a given amount of information is also reduced.

The foregoing and other objects, features, and advantages of the invention will be apparent from the following more particular description of the preferred embodiment of the invention as illustrated in the accompanying drawings.

Figure 4A:
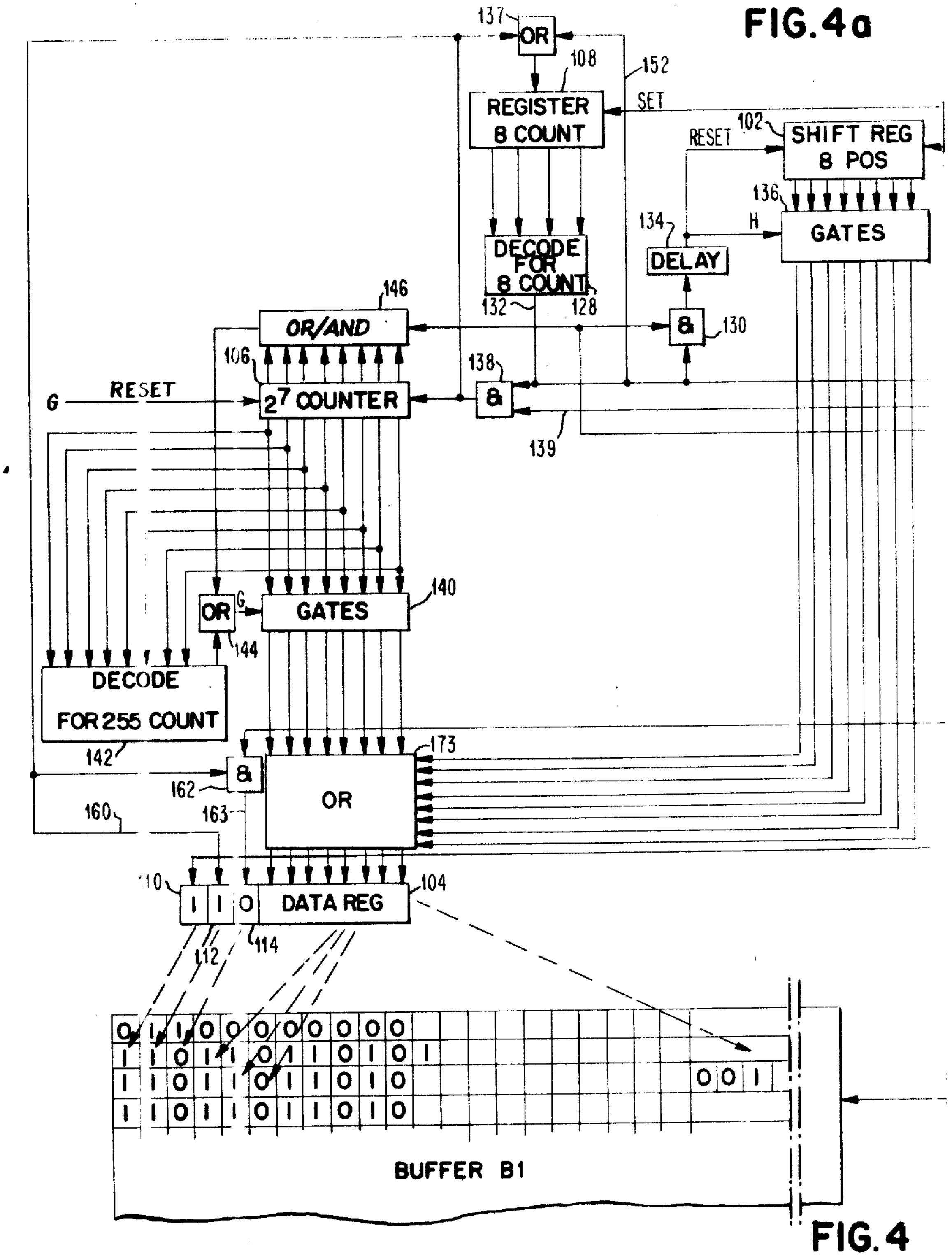
FIG. 4 is a diagrammatic representation showing how FIGS. 4*a*, 4*b* fit together.

FIGS. 4*a*, *b* are detailed drawings of the horizontal compression section of the subject two-dimensional data compactor.

Figure 5:
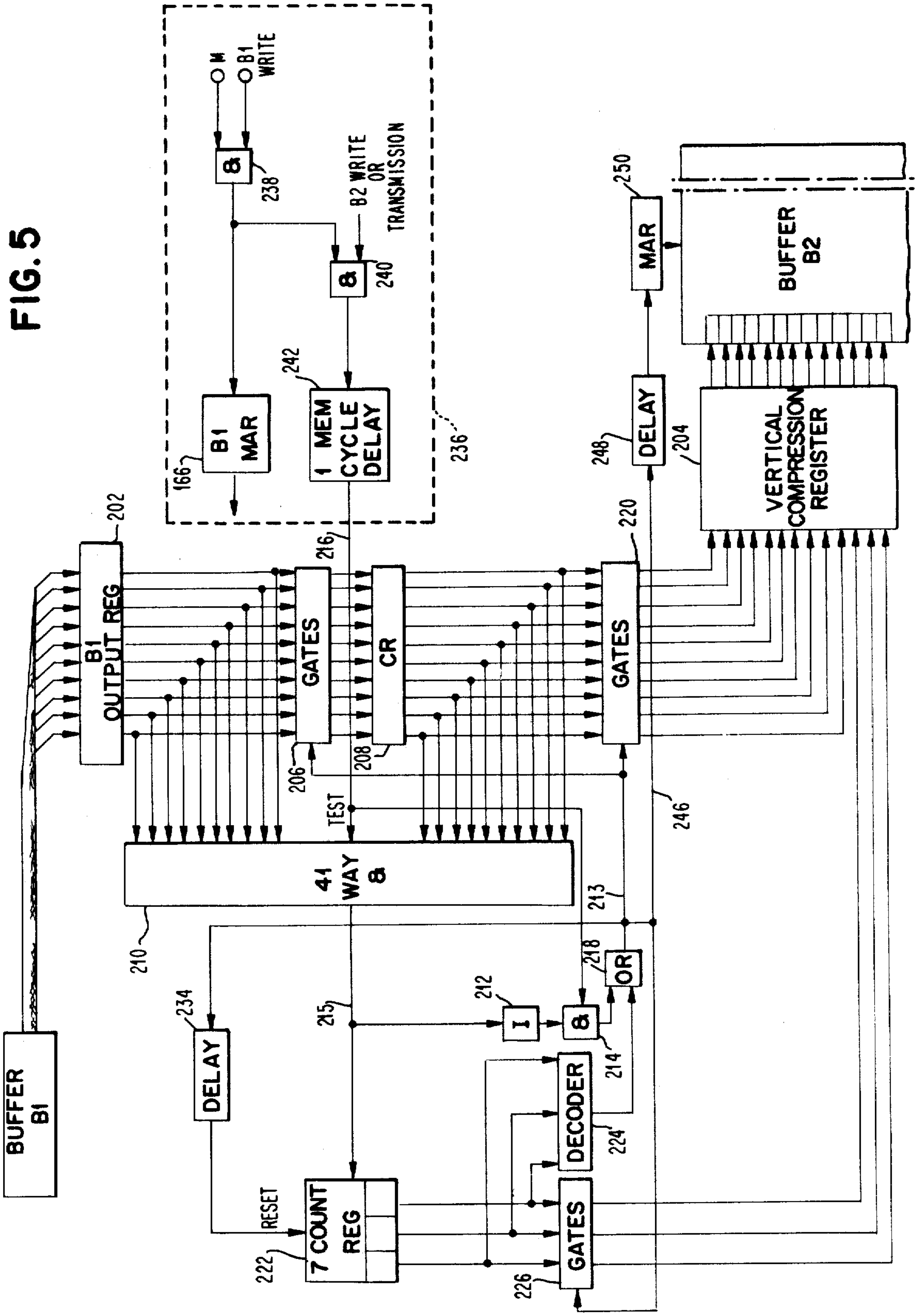

FIG. 5 is a detailed drawing of the vertical compression unit of the subject two-dimensional data compactor, together with a buffer storage.

FIG. 6 represents an illustrative example of the word storage and scan that is utilized in the preferred embodiment.

FIGS. 7*a–c* illustrate a particular input of uncompressed data, the arrangement of the horizontally compressed data in storage, and the arrangement of the overall compressed data in a second storage, respectively.

Figure 1:
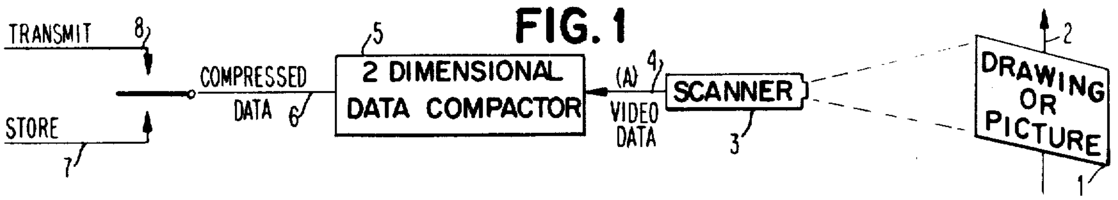
FIG. 1 illustrates a system utilizing the subject two-dimensional data compactor.

Referring to FIG. 1, a system is shown in which a drawing or picture 1, either stationary or in motion in the direction of the arrow 2, is scanned by the scanner 3. The signal output of the scanner is either an up or a down level, indicating the presence or absence of information, and is denoted as waveform A appearing on line 4. This video data enters the two-dimensional data compactor 5 where it is examined for both horizontal and vertical redundancy. That is, any redundancy which existed in the original drawing or picture 1, in either a horizontal or a vertical direction, is compressed so that overall compressed data is present on the output line 6. This compressed data can then be either stored or transmitted, as indicated schematically by the lines 7, 8 respectively.

Figure 2:
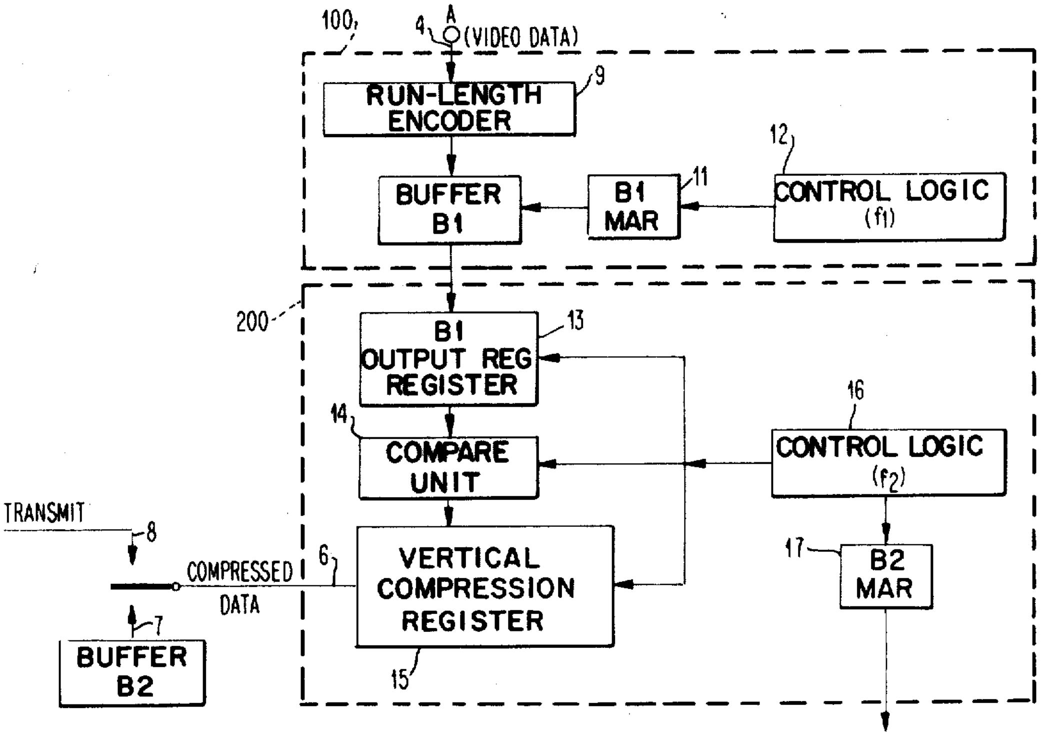
FIG. 2 represents a block diagram of the subject two-dimensional data compactor.

Referring to FIG. 2, a block diagram of the two dimensional data compactor 5 is shown. Here it is seen that the video data A enters the horizontal compression unit 100 on line 4. This binary data enters a run-length encoder 9, where it is compressed according to conventional techniques as outlined above.

The arrangement of the data in the first buffer B1, prior to being read out, need not be unique as this buffer storage is a random access device and by proper logic, the data can be scanned in many ways. The particular arrangement of storage that is chosen is one which allows the stored data to be scanned such that the vertical redundancy which existed in the original document can be reduced. Hence, only unidirectional scan of the original document is required in this apparatus for two-dimensional data compression. This readout will consist of corresponding portions of adjacent horizontal lines as they exist in the original document. Thus, as one is reading out of the first buffer B1, regardless of the physical position of the data, one is literally examining a pseudo-image of the document, pseudo in that the horizontal detail has been removed and the data arrangement in buffer B1 is positionally controlled. Control logic 12, operating at a frequency $f_1$, is provided for buffer B1.

This horizontally compressed data is then read out of buffer B1 and entered into the vertical compression unit 200 of the data compactor. Data is read out of buffer B1 in 10-bit segments, each segment being comprised of an 8 bit word and various tag bits which will be explained later. The segments may be comprised of either detail words (where there is no redundancy) or compressed words, which indicate that horizontal redundancy exists in the document 1.

In the vertical compression unit 200, data representing corresponding portions of adjacent horizontal lines of the original document are entered into the register 13. Then, this data enters the compare unit 14 in which successive words from horizontal unit 100 are compared for redundancy. After comparison, either detail words indicating that no vertical redundancy exists, or compressed words, representing vertical redundancy, are entered into the vertical compression register 15. Further tag bits are used to indicate the number of horizontal image lines over which word redundancy existed. Control logic 16 operating at a frequency $f_2$ less than $f_1$ operates the vertical compression unit 200.

Thus, it is seen that video data is compressed in a horizontal direction in the unit 100. This horizontally compressed data then enters a vertical compression unit 200, in which corresponding portions of adjacent horizontal line scans of the original document are compared in order to determine whether or not redundancy exists in the vertical direction. The overall, or two-dimensionally compressed, data is available from the vertical compression register 15 on line 6, after which it may be either transmitted (line 8) or returned to storage in another buffer B2 (line 7). The storage cycle time of this second buffer may be significantly slower than that of the first buffer B1 ($f_2<f_1$). Consequently, the buffer B2 can be bulk storage, such as tape or disks, which operate at a slower speed than buffer B1, and is cheaper in cost/bit of storage. In this way, the size of buffer B1 is kept to a minimum, which further reduces cost. In practice, the dimensions of the buffers, and particularly the first buffer, would be related to the type of document being scanned, i.e., the optimum word length for the run-length encoding would in part dictate the dimension of the buffer to be chosen.

Figure 3:
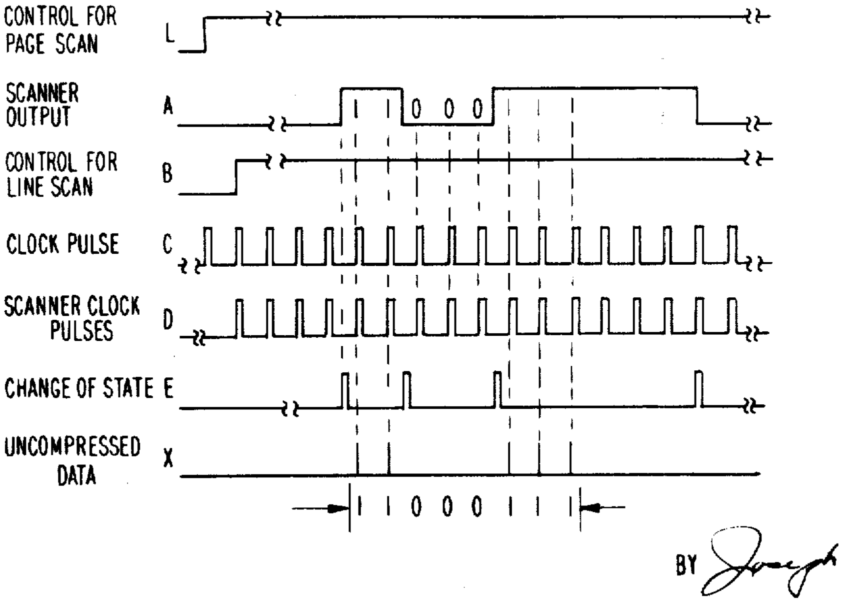
FIG. 3 is a timing chart, illustrating the digital waveforms for operation of the subject data compactor.

Referring to FIG. 3, L is a waveform indicating the start of a page scan. This line must be up (positive) as it is a control line, in order for scanning to take place. The scanner output is represented by the waveform A. This is either an up or a down level indicating a white or black level, which is represented here as either a binary 1 or a binary 0 respectively. B is a waveform indicating the start of a particular line scan. C is a waveform indicating a continuously running clock output. D is a scanner clock pulse, resulting from the gating of the continuously running clock pulses C with waveform B, the control for a line scan. The waveform E is the clocked output, change-of-state waveform which indicates a changed state of the video data A, i.e., a change from white to black, or vice-versa. X is merely a digital representation of the video data A.

HORIZONTAL COMRESSION UNIT

Figure 4:
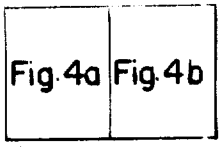
Figure 4B:
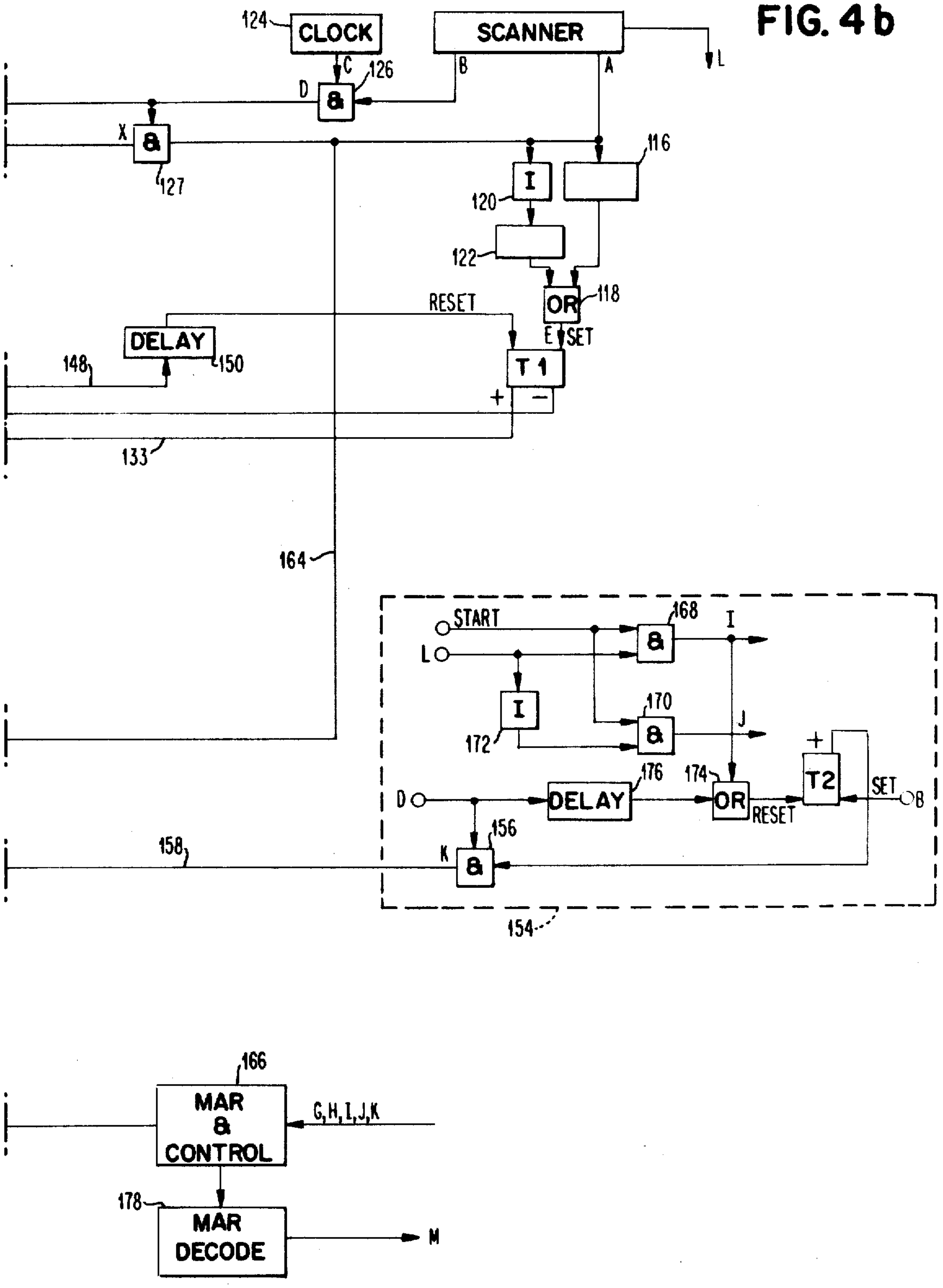

Referring to FIGS. 4*a*, 4*b*, a preferred embodiment of the horizontal compression unit 100 is shown.

In this embodiment, there is input comparison means for comparing adjacent bits of input data and for generating an output when successive bits are different. This comparison means includes means for generating a change-of-state waveform and bistable means that is set by the change-of-state waveform.

Also present is a sampling means which samples successive frames of input data bits, each such frame having an arbitrary minimum bit length. The sampling means illustrated in the preferred embodiment is shift register 102. Control means are provided for controlling the readout and resetting of this sampling means. This control means further includes a counting means 108 and associated decoder 128 for counting the minimum number of bits in a frame, and also a means for gating out the contents of the sampling means.

Horizontal compression means is provided to count the number of minimum length frames of input data that are identical. In the preferred embodiment, the horizontal compression means is a counter 106. Means are provided for decoding the contents of this compression means and for gating out its contents.

Further, storage means B1 is provided for storing data words representing a pseudo-image of the document. The words to be stored are made up from the contents of both the sampling means and the horizontal compression means. The contents of the sampling means, when there is a change-of-state within a minimum length frame of input data, are detail words, while the contents of the horizontal compression means are compressed words.

Also provided is tage bit circuitry which provides various bits that are used to "describe" the words entered into the storage means. These tag bits indicate whether or not the word occurs at the start of a horizontal line scan, whether the word is a detail word or a compressed word, and whether or not the compressed word contains ones or zeros. This circuitry also provides control signals which are inputs to a memory address register (MAR) that controls the reading of data to and from the storage means.

In this embodiment, the video data, represented by waveform A, enters the horizontal compression unit 100, where horizontal redundancy of the original document is to be reduced. Means is provided in this horizontal compression unit to produce a change-of-state waveform E, which waveform indicates when the scanner output A changes between white and black level. Also, a shift register 102 is provided, which shift register samples uncompressed bits of data represented by the waveform X. If there is a change of state within a fixed number (frame) of bits of the line being scanned, a detail word, comprising the actual bits scanned, will be gated into a data register 104 before entry into the buffer B1. In the preferred embodiment, the minimum number of bits (smallest frame) over which comparison is performed is 8, although this number may be changed, depending on the redundancy of the document. If the adjacent bits of a horizontal scan do not vary, i.e., are consistently either white or black for greater than an 8-bit frame, the number of eight-bit words which are the same is recorded by the horizontal compression means ($2^7$ counter 106). The size of the counter 106 is optional, and can be chosen for any value, depending upon the redundancy of the system and the buffer storage.

An 8-count register 108 is provided which register is set by clock pulses D occurring during a line scan. The size of this register 108 is determined by the size of the detail word in the system, in this case 8 bits. The 8-count register 108 counts 8 bits and, when decoded, indicates that the equivalent of 8 bits of the horizontal line have been scanned. This provides a pulse to the counter 106 which counts the number of detail words that are the same. In this case the maximum number of identical 8-bit words which can be accommodated is $2^7$ (2040 bits of the original data X). In other words, a compressed word can be formed, which word represents the number of data bits that are the same and which tells what these bits are, i.e., 1 or 0. This compressed word is gated out of the $2^7$ counter 106 and is applied to the data register 104 before entry into the buffer B1.

In addition to the 8-bit detail or compressed word, three extra bits are attached to each word in the data register 104. These first three bits to the data register 104 indicate:

(a) the start of a line scan (bit position 110)
(b) whether the word is a compression word (1) or a detail word (0) (bit position 112)
(c) whether a white (1) or a black (0) is contained in the compression word (bit position 114).

It is not necessary to use a bit to identify the start of a line scan if the bits are placed in buffer B1 in such a way that the start of a line scan can be recognized by the position of the word. In all cases, the image being placed in buffer B1 forms in that storage a pseudo-image of the original document. Scanning this pseudo-image is essentially a second scan of the original document 1 and, by examining the words as they are read out of buffer B1, the vertical redundancy of the document is reduced. That is, corresponding portions of adjacent horizontal line scans are compared so that vertical compression is achieved. Hence, only horizontal scans of the original document are required.

In more detail, the video data A is applied to differentiator 116 and then as one input to an OR circuit 118. This data A is also applied to an inverter 120, and to another differentiator 122, and then to the same OR circuit 118. The output of the OR circuit 118 is the change-of-state waveform E which is used as the SET pulse to the change-of-state trigger T1. This trigger produces a positive output if there has been a change of state of the video data A, or no output if there has been no change of state of the video data A.

Shaped clock pulses C from a continuously running clock 124 are gated, in AND gate 126, with waveform B, which represents the start of a line scan. The output of this AND gate 126 is the waveform D. The scanner clock pulses D are gated in AND gate 127 with the video output A to produce uncompressed data X, which is entered into the 8-position shift register 102. An 8-count register 108 is provided, which register is set by the clock pulses D which occur during a line scan. The size of this register 108 is determined by the size of the detail word in the system, in this case 8 bits. This 8-count register 108 counts 8 bits and, when decoded by decoded 128, indicates that the equivalent of 8 bits of the horizontal line have been scanned. A $2^7$ counter 106 is provided to count the number of 8-bit frames (detail words) that are the same. Each time the 8-count decoder 128 fires, it puts a 1 count in the $2^7$ counter 106.

For example, if all black level is being scanned, "zero" bits will be inputed into the 8-position shift register 102. If all white level is being scanned, "one" bits will be loaded into the 8-position shift register 102. If the document contains sufficient detail (a change of state within 8 bits), both "ones" and "zeros" will be loaded into the 8-position shift register 102.

Also, in this last case, the output of the change-of-state trigger T1 will be positive, indicating that a change-of-state of the video data A has occurred. This positive signal will be transmitted to the AND gate 130. When the 8-count register 108 is decoded, an output will appear on line 132 and will be transmitted to AND circuit 130, thus causing an output to be sent through delay 134 to be applied to the AND gates 136. This gates the 8 detail bits out of the 8-position shift register 102 into the OR gate 173 and then into the data register 104. The delay produced by element 134 is small and allows the last (8th) bit to to counted by register 108 and decoded by unit 128 before reading out the contents of shift register 102. The size of the delay is a function of the clock speed.

If there is a considable amount of horizontal redundancy throughout a particular horizontal line, identical bits (either constant "one's" or "zero's") will be loaded into the 8-position shift register 102. In this case there will not be an output from the change-of-state trigger T1. Since there is no output from the change-of-state trigger, the AND gates 136 will not gate out the contents of the 8-position shift register 102. The 8-count register 108 will, however, continue to count 8 bits and, when decoded, will provide an output to AND gate 138. Due to the fact that there is no output from the change-of-state trigger T1, this AND gate 138 will provide a pulse to the $2^7$ counter 106. Consequently, each time the 8-count decoder 128 fires it will put a one count into the $2^7$ counter 106. In this way, a count will be had of the number of the 8-position shift register 102. The 8-count register If there has been no change of state for $2^7$ or 255 bits, the contents of the $2^7$ counter 106 will be gated out of the counter by gates 140 and transferred to the data register 104 via OR gate 173. In order to open the gates 140, the output of the $2^7$ counter 106 is continuously decoded and each time the decoder 142 fires it will provide an input to OR circuit 144. The $2^7$ counter 106 feeds the OR/AND circuit 146 which provides another input to the OR circuit 144. OR/AND circuit 146 provides this input whenever any one of the stages of $2^7$ counter 106 contains a bit and change of stage trigger T1 is set. The change-of-state trigger T1, if set, is always reset by the output of the 8-count decoder 128, which output is transmitted on line 148 and applied through the delay 150 to the change-of-state trigger T1. The 8-count register 108 is always reset by a full 8 count, applied on line 152, or by the output of AND gate 138. The RESET signal to the 8-count register 108 is the output of OR circuit 137. Register 108 is set by the scanner clock pulses D.

In addition to the 8-bit compressed word or detail word, 3 extra bits are attached to the data which enters the data register 104. As mentioned previously, these additional bits indicate respectively:

(a) the start of the line scan (bit position 110)
(b) whether the word is a compression word (1) or a detail word (0) (bit position 112)
(c) whether a white (1) or a black (0) state is contained in the compression word (bit position 114).

In addition to other functions, the circuitry indicated in box 154 provides a "1" bit whenever the start of a line scan is indicated. In more detail, a control line B for the start of the line scan is applied as a SET pulse to the line start trigger T2. When set, trigger T2 will provide a positive output which is ANDED with the scanner clock pulses D in AND gate 156. The output of the AND gate 156 appears on line 158 and is used to set a "1" bit in the first position 110 of the data register 104, whenever the start of a line scan is indicated.

In order to generate a "1" bit or a "0" bit for bit position 112 in the data register 104, that is, the bit which indicates whether or not a compression word is present, the output of AND gate 138 is applied, on line 160, to bit position 112. The output of AND gate 138 is also applied to the AND gate 162 where it is ANDED with the video data waveform A appearing on line 164. If the video data A is an up level, i.e., a white level, a "1" will be written into bit position 114 of the data register 104. If the video data A is a down level, no bit will be entered into this bit position.

It is not necessary to use a bit to identify the start of a line scan if the bits are placed in buffer B1 such a way that the start of a line scan can be recognized by the position of a word. It is only important that the words being placed by control in buffer B1 form, in this storage, a psuedo-image of the original document 1. If this is the case, the information in buffer B1 can be read out in order to effect a second document scan, enabling the reduction of the vertical redundancy of the document.

In FIG. 4, a plane of buffer B1 is shown. Here, the first word (either a detail word or a compressed word) of a line scan is placed in the first row and at the extreme left of the row. The next word of the same line scan is placed in the same row, adjacent to the first word. This continues until the end of the first horizontal line scan. The first word of the second horizontal line scan is placed in the second row of the memory plane under the corresponding first word of the first horizontal line scan. The second word of the second horizontal scan is placed in the second row beneath the corresponding word of the first horizontal scan, etc. The words are written into buffer B1 in this fashion so that, when read out, corresponding portions of adjacent line scans will be compared in order to reduce the vertical redundancy.

The circuitry enclosed in box 154 also provides various control signals for the memory address register 166. Thus, the combination of AND circuits 168, 170, and the inverter 172 provide output signals I, J, where J is the negative of I. The signal I denotes the start of a page and is the bit placed in bit position 110 in register 104. Either I or J is up when switch "start" is closed. The signal I also steps memory address register 166 to a starting "new page" position. The signal J is used to signal the image "END" (end of document page), and also steps the memory address register 166. It is included in the data register word as a 12th bit (not shown) in schematic). The inputs to the AND circuit 168 are a start signal and the control signal L for a page scan (L faces to a down level at the end of a page). The waveform I is an input to OR circuit 174, whose other input is the scanner clock pulses D, which are delayed by an amount of time by delay 176. This delay is necessary since the output of the OR circuit 174 is used as a RESET signal to the Trigger T2, whose positive output is used as an input to AND circuit 156. The delay time in element 176 just is enough so that when trigger T2 is set, it is on long enough to have a useful output before being reset by 0. The output of AND circuit 156 is, as seen previously, the signal which writes a "1" bit into the first bit position 110 of the data register 104 when a new line is to be scanned. The SET signal for trigger T2 is the control for a line scan (waveform B).

The memory address register and control 166 has as inputs the control signals I, J, G, H, and K. G is the output signal of the OR gate 144, which signal opens the gates 140, to allow the contents of the counter 106 to be entered into data register 104. The signal H is the signal which opens the AND gates 136 to allow the bits representing a detail word to be entered into the data register 104 from the 8-position shift register 102. It is to be noted that the signals I, K always position the memory address register 166 to a "new line start" address.

The MAR decoding network 178 indicates a specified number of stored lines of scan, and is used to trigger transfer of the content of buffer B1 to a buffer output register 202 (FIG. 5) during a write cycle of buffer B1. That is, in the example noted, the corresponding portions of 7 adjacent horizontal lines of scan will be compared when the signal M is present. This will be explained in more detail in the following description.

VERTICAL COMPRESSION UNIT

In the preferred embodiment (FIG. 5), a first data collection means 202 is provided for temporarily storing the contents of the storage means B1. These words are read into this data collection means in a particular word-by-word fashion, such that successive words received by this data collection means are digital words which represent corresponding portions of adjacent horizontal line scans. Readout of buffer B1 in this fashion effects a vertical scan of the original document; a further advantage is that this second scan is over already compressed data, not data taken directly from the document 1.

Also provided is a second data collection means 208 for temporarily storing the words received in sequence from the first data collection means. Both of these data collection means store a single word at a time in the embodiment illustrated, but this can be variable. Circuitry is provided which generates an output test pulse after readout of each word from the storage means B1 to the first data collection means.

The words contained in the first and second data collection means are compared, upon the incidence of the aforementioned test pulses, in a comparison means 210. The comparison means provides an output only when the compared words are identical.

Vertical compression means 222 is provided for determining the number of successive words from storage B1 that are identical. This compression means is set by the output of the comparison means.

Also provided is control means for gating out the contents of the first and second data collection means and also the vertical compression means. This control means includes circuitry that is responsive to the output of the comparison means and separate gate units for both the first and second data collection means, and for the vertical compression means. Means 224 are provided for decoding the vertical compression means.

A third data collection means 204 is provided for temporarily storing the output from the second data collection means and the output from the vertical compression means. The combination of these outputs in this 3rd data collection means is the twice compressed data, in which both horizontal redundancy and vertical redundancy, existing in the original document, is reduced.

The twice compressed data either can be transmitted directly or placed in a second storage B2. This second storage is controlled by a memory address register 250 in the preferred embodiment.

Referring to FIG. 5, which shows the vertical compression unit 200 of the subject data compactor, it is noted that the contents of buffer B1 represent a pseudo-image of the original document. Because a pseudo-image is stored, it is possible to examine this image for any vertical redundancy which exists in the original drawing. The vertical compression unit 200 compares corresponding portions of adjacent horizontal line scans to determine if redundancy is present. As with the horizontal compression unit 100, a run-length encodement scheme is utilized for this comparison. That is, if corresponding portions of adjacent horizontal lines are not the same, detail words will be entered directly into the vertical compression register 204 as 10-bit words. Only the information content of each words is compared, i.e., the bit indicating a start of a line scan (bit position 110 in data register 104) is not included in the words read out of buffer B1. The control logic units 12, 16 (FIG. 2) keep track of the words to be compared, so that it is not necessary to include this bit in the words to be compared in the vertical compression unit 200. Consequently, in FIG. 5, only 10 lines are taken from buffer B1 into the buffer output register 202. If the twice compressed data is to be stored (in B2), an extra bit will be added to properly locate the words; however, if the twice compressed data is to be directly transmitted, a code word can be placed on the transmit line to indicate the start of a message.

At any rate, if the words representing corresponding portions of adjacent horizontal line scans are the same, a count will be kept of the number of times this redundancy appears. In this case a compressed word, indicating the amount of redundancy, will be entered into the vertical compression register 204. The additional inputs into the first three bit positions of this register are used to indicate the number of words, representing corresponding portions of adjacent line scans, which are identical. In the example shown, words representing corresponding portions of up to seven adjacent horizontal line scans are compared. Here, a count of seven is employed, although more or less could be used depending upon the amount of redundancy expected.

In more detail, words corresponding to adjacent portions of horizontal line scans are read out of buffer B1 into buffer output register 202. As mentioned previously, these words are 10 bits in length, as the first tag bit, indicating the start of a line scan, is not needed for compression purposes. It is merely a control bit. The second word from buffer B1 goes into the buffer output register 202, while the first word from buffer B1 is being gated by gates 206 into the compare register 208. Since no comparison has yet been made, there will be no output from the 41-way AND circuit 210 and, consequently a positive signal will appear at the output of the inverter 212. The output of inverter 212 is ANDED in circuit 214 with a test signal appearing on line 216. The output of AND circuit 214 is one input to the OR circuit 218, whose output opens the gates 206 and also the gates 220.

At this time, the word in the compare register 208 is compared to the word contained in the buffer output register 202, through the 41-way AND circuit 210. This AND circuit could be replaced by an exclusive OR circuit. If the words are not identical, no signal will appear at the output of the 41-way AND circuit and, consequently, a positive output will be provided from the inverter 212. This is combined with the test signal appearing on line 216 in the AND gate 210 and the output is provided to the OR gate 218. The output of this OR gate, as stated before, allows the first word in the compare register 208 to be gated directly, as a detail word, into the proper bit positions in the vertical compression register 204.

When the words in the compare register 208 and the buffer output register 202 are the same, a count is made of the number of times this identity occurs. In the example chosen, up to 7 words representing corresponding portions of adjacent horizontal line scans can be compared. The 7-count register 222 is inputed by a positive signal from the 41-way AND circuit. When the full 7 count is obtained, the 7-count decoder 224 will fire, causing an input to OR circuit 218 which is fed back to open AND gates 226, thus causing a count to be made in the first three bit positions 228, 230, 232 of the vertical compression register. These first three bit positions are an indication of the number of words, representing corresponding portions of adjacent horizontal line scans, which are identical, up to a count of 7. If at any time there is a "no compare" condition, a positive output will appear from inverter circuit 212, which will cause an output from OR circuit 218, thus gating the bits contained in the compare register 208 into the 10-bit word position of the vertical compression register 204. The output signal from OR gate 218 is also fed back through a delay 234 to reset the 7-count register 222 to zero. Since the contents of register 222 are used to reset this register, the purpose of the delay in unit 234 is to keep the level of output of register 222 up long enough to have a useable output. This delay is approximately one microsecond, depending on the clock speed.

The test signal, which is used to trigger the 41-way AND circuit 210 for comparison of adjacent words, is derived on line 216 from the circuitry indicated in box 236. The output of the MAR detector 178 (FIG. 4) is ANDED with a WRITE signal for buffer B1. The output of this AND gate 238 initiates either a WRITE cycle of the data from register 204 into a second buffer B2 or transmission of this data directly from the register 204. This signal (initiating WRITE or TRANSMISSION) is gated, in AND circuit 240, with a signal for writing the data into B2, or with a signal for transmission of the data directly from the register 204. The output of AND gate 240, after delay in unit 242, is the test signal appearing on line 216. The output signal from AND gate 238 is also applied to the B1 MAR and Control 166 (FIG. 4) in order to step this memory address register vertically in increments up to 7 steps until words corresponding to adjacent portions of 7 horizontal lines are scanned. The next READ cycle for buffer B1 will be concerned with the scanning of the second word position of the same 7 lines, etc.

In FIG. 5, the twice compressed data appearing on line 244 is entered for storage into buffer B2, as 13 bit words. It is to be recognized that this compressed data could be transmitted directly, rather than being stored. In the embodiment shown, the output of OR Circuit 218, indicative of either a "no compare" situation or an "end of successful compare" situation is transmitted on line 246 through a delay 248 to step the buffer B2 memory address register 250, in order to write the words from the vertical compression register 204 into the buffer B2. The delay produced by element 248 is approximately 2–3 microseconds and is necessary to permit the reading in of data before the memory address register is stepped.

It is to be noted that the words contained in buffer B2, representing an overall compression of the data representative of document 1 could be transmitted from buffer B2, or decoded to reproduce the original document. When storage is made into the second buffer B2, the storage cycle time of this buffer may be significantly lower than that of the first buffer B1 so that the second buffer may be a bulk storage type, such as tape or disk. Since the buffer speed of the second buffer is much higher than that of the first buffer, the information being stored in the first buffer would, in general, be approximately 1/10 of the data rate of a normal buffer. Thus, the second buffer generally is always waiting for information; consequently, the first buffer can be kept small, which is an economic advantage. The overall storage due to compression represents a reduced storage cost.

FIG. 6 shows, in conceptual form, the arrangement of the words in buffers B1 and B2, according to the preferred embodiment. The horizontally encoded data from data register 104 enters buffer B1 and is placed in storage therein. The bottom plane 300 of this memory is shown having words contained thereon. Here, words W1, W2, W3 . . . W60 are words corresponding to one horizontal line scane of the document. They may be either detail words or compressed words, depending on whether or not there was horizontal redundancy across this line of scan. In this example, a horizontal line of scan consists of 60 words, although this is variable.

The second row of plane 300 contains words W61, W62 . . . W120. This row contains words representative of corresponding portions of an adjacent second horizontal line of scanning. Placement of the words in storage is continued until this plane of memory is complete, at which time storage of the words is begun into the second plane of memory, etc. In all cases, the first word of a horizontal line scan is placed in the first word position of each row of the memory plane. That is, words W1, W61, W121, W181, W241 . . . are the first words derived respectively from succeeding horizontal line scans. Words W2, W62, W122 . . . correspond to the second words of succeeding horizontal line scans.

In order to determine vertical redundancy, these words are read out of buffer B1 in vertical fashion, i.e., word W1 is compared with word W61, with W121, with W181 . . . . The scan is in the direction of the arrows labeled S1, S2, S3. After all the words corresponding to the first word position of horizontal line scans are compared, the second words of horizontal line scans are compared, i.e., word W2 is compared with W62, with W122 . . . . This scanning process continues across the vertical columns of the memory plane 300.

The words which are read out of buffer B1 enter the vertical compression unit 200 where they are compared. They are then either stored in buffer B2, or transmitted. If they are stored in a second buffer, they are stored as 13-bit words with the first three bits representative of the number of lines, up to 7, over which the words are identical. They are placed in storage as shown here, W'1 representing either a detail word, or a compressed word representative of the redundancy of some or all of the words in the first vertical column of memory plane 300 of buffer B1. W'2 is the second word representative of the redundancy of the first vertical column of memory plane 300. This scanning and comparing continues until the last word W'n of the first vertical line scan of plane 300 is obtained. The encoded words from the scan of the second vertical column of memory plane 300 of buffer B1 are words $W'(n+1)$, $W'(n+2)$, etc.

It should be noted that, since both buffers are random access devices, the arrangement of data in the buffers is not unique to the particular scheme described. It is only necessary that the arrangement of data be controlled so that vertical redundancy can be obtained by read-out of the first buffer. Thus, the control logic relative to the addressing of the buffers for both storage and read-out must be related to the method of storage and to the buffer structure. In practice, the dimensions of the buffers, and particularly the first buffer, would be related to the type of document being scanned; that is, the optimum word length for run-length encoding would in part dictate the dimensions of the buffer chosen.

It is to be further noted that any length of data can be compared by this scheme, as in some cases it may be advisable to compare complete lines rather than just words. Also, the device can be used to compare multiple documents. In this case a tag bit could be used to indicate the start of scan for a new document.

OPERATION

In order to more fully understand the operation of the subject data compactor, a detailed example will be explained. For this discussion, reference is made to FIGS. 7*a–c*, which show respectively, a sample of uncompressed data X, and the arrangement and construction of words in storage units B1, B2. Reference should also be made to FIGS. 4 and 5 which show the horizontal compression unit and the vertical compression unit respectively.

Referring to FIG. 7*a*, the uncompressed data X, which results from horizontal line scans of the original document 1, is shown. Here, various bits are shown for only the first four horizontal scan lines, it being understood that the scanning operation is merely repetitive with respect to the rest of the document. Also, FIG. 7*a* shows only a portion of the number of bits which would be obtained from a line scan.

In the particular embodiment shown, the adjacent bits of a horizontal line scan are to be compared over a frame not less than 8 bits in length (detail word), nor more than 2040 bits. The frames are designated by the letters F1, F2 . . . **F*n*. That is, if there is a change of state within eight bits of a horizontal line scan, these eight bits will comprise a detail word and will be entered directly into the data register 104. If there is redundancy for more than eight bits, the horizontal compression unit will tabulate that redundancy and enter a word into the data register 104**, which word which will be a compressed word indicative of the amount of redundancy (up to 2040 bits in the preferred embodiment) obtained in a segment of a horizontal line scan.

Referring to FIG. 4, the uncompressed data from the first horizontal line scan enters the eight position shift register 102. In this case, the first eight bits of line scan 1 contain at least one change of state within a unit eight bits long. Hence, the frame F1 will be 8 bits in length. Due to the change of state of the input data, the change-of-state trigger T1 will generate a positive output which will be applied as one input to the AND gate 130. The eight count register 108 is set by the gated clock pulses D. This register counts the number of bits entered into the eight position shift register 102 and, when decoded by decoder 128, indicates that the equivalent of eight bits of the first horizontal line scan have been sampled. At this time, the decoder 128 provides an output on line 132, which output is the other input to AND gate 130. This AND gate provides an output signal, which is delayed by unit 134 as explained previously, and which is the signal H that opens the gates 136. This same signal H resets the eight position shift register 102 after its contents have been gated out. These first eight bits of the first line of horizontal scan are then entered into the data register 104.

Since this is the start of a horizontal line scan, a positive signal will appear on line 158, which signal will enter a "1" bit into bit position 110 of the data register 104. To provide this positive signal on line 158, a control line B for the start of a line scan is applied as a SET pulse to the line start trigger T2. When set, this trigger will provide a positive output which is ANDED with the gated clock pulses D in AND gate 156, to provide the output on line 158.

Since these first eight bits of the first horizontal line scan contained detail (change-of-state), they have been transferred as a detail word directly into the data register 104. Therefore, a "0" bit is left in bit position 112 of data register 104. Because there was a change of state within this frame F1, a negative output did not appear from the change-of-state trigger T1. Therefore, only one input was present to AND gate 138. Accordingly, no output appeared on line 160, so that a "1" bit would not be set into bit position 112 of data register 104.

Also, since there is no signal line 160, one input to AND gate 162 is absent and hence a "1" bit will not be entered into bit position 114 of data register 104. This is correct because the first frame considered in horizontal line scan 1 contains detail.

The combination of bits from frame F1, and the three tag bits, is the word W1. The first three digits of word W1 are indicative of the facts that: this is the start of a line scan, it is not a compression word, and, since it is not a compression word, no bit is needed to signify what type of bits will follow. Succeeding words are designated by the symbols W2, W3 . . . W*n* . . . W2*n*. . . . This first word in data register 104 is now entered into buffer B1. Referring to FIG. 7*b*, a plane of buffer B1 is shown to illustrate the placement of words into this buffer. Detail word W1 is entered into the first word position of row 1. However, since this is a random access storage, the words can be entered into any word positions, as long as it is known where they are located.

The next eight bits to enter the eight position shift register 102 are those in frame F2, as seen in FIG. 7*a*. These eight bits will be directly transferred to the data register 104, as there is a change of state occurring within this eight bit frame. Tag bits will be placed in bit positions 110, 112 to indicate that this is not the start of a line scan, and that it is not a compression word. Since it is not a compression word, a "1" bit will not be placed in bit position 114.

Consequently, the operation of the horizontal compression unit will be the same as when the bits in frame F1 were sampled. The resulting word in data register 104 is written into the second word position of row 1 of buffer B1, and is designated W2.

In the example chosen, the next 2040 bits appearing in the first horizontal line scan are all "1's"; hence, frame F3 will be 2040 bits in length. These bits will be continuously loaded into the eight position shift register 102. However, in this case, there will not be a positive output from the change-of-state trigger T1. Since there is no output from this trigger, the AND gate 130 will not provide an output and hence the signal H will not appear to open the gates 136. Also, the eight position shift register 102 will not be reset after eight bits have been loaded in, but will continue to receive the "1" bits until 2040 bits are loaded.

The eight count register 108 will continue to count eight bits and, when decoded, will provide an output to AND gate 138. Since there has been no change of state, another input will appear from trigger T1 to AND gate 138; hence, this AND gate will provide an output. This output is applied to the $2^7$ counter 106. It is also applied to OR gate 137 and from OR gate 137 is applied as a RESET signal to the eight count register 108. Consequently, each time the eight count decoder 128 fires it will put a "one count" in the $2^7$ counter 106. In this way, a count will be obtained of the number of eight-bit units over which no change of state occurs. In this case, there will be no change of state for $8\times255=2040$ bits.

The output of the $2^7$ counter 106 is continuously decoded and, when 2040 bits have been entered into the shift register 102, a signal will be supplied from decoder 142 to OR gate 144. The output G of this OR gate opens the gates 140, and the contents of the counter 106 are then transferred to the data register 104. Also, the $2^7$ counter 106 feeds the OR/AND circuit 146, which provides another input to OR circuit 144. In the particular example shown, 2040 bits are identical, and the gates 140 are opened when the decoder 142 has reached a binary count $2^0+2^1+ \ldots +2^7=255$. If, however, a change of state occurred before 2040 bits were sampled, a positive output would result from the change-of-state trigger T1, which output would be applied as another input to OR/AND gate 146. In this case, this OR/AND gate would provide an input to OR gate 144 whose output would open the gates 140. Thus it is apparent that the gates 140 are conditioned by either a full 255 count of the decoder 142 or by a change-of-state of input data.

The change-of-state trigger, if set, is always reset by the output of the eight count decoder 128, which output is transmitted on line 148 and applied to the delay 150 before resetting the change-of-state trigger T1. The delay is for an amount of time equal to a value less than one bit time of the scanner output. This allows the trigger T1 to gate a correct level on lines 133, 139 and, when in the RESET state, to be reset before the next scanner output bit time.

As before, three additional bits are needed to complement the contents of the counter 106, which have been put in data register 104. The first of these bits is indicative of whether or not this is the start of a line scan. Since in this case these 2040 bits F3 did not occur at the start of a line scan, a "0" bit is entered into bit position 110 of data register 104. Since the control for a line scan B does not appear as a set signal to the trigger T2, this trigger will not provide a positive output to AND gate 156. Accordingly, no signal will appear on line 158, and a "0" bit will be entered into bit position 110. This third frame has been compressed and the redundancy is indicated by the contents of counter 106. Therefore a "1" bit has to be entered in bit position 112 of data register 104. Since, after a binary count of 255 has been reached, an output will appear from decoder 128 and, also, a signal will appear on line 139, two inputs are present to AND gate 138. Therefore, this AND gate will provide an output on line 160, and a "1" bit will be written into bit position 112.

In this particular case, the compressed word is indicative of consecutive "1" bits. Therefore, a "1" bit must be entered into bit position 114. Since there is a signal appearing on line 160 as one input to AND gate 162, and since the video data signal A is present, there will be another input to this AND gate 162. Accordingly, there will be a positive output applied on line 163 to write a "1" into bit position 114.

This compressed word will then be entered into buffer B1 and is denoted by word W3 in the third word position of row 1 of a sample memory plane 300 of buffer B1.

This sampling of the data bits obtained from the first horizontal line scan of the original document is continued until all the bits in the first horizontal line (frames F1, F2 . . . F*n*) have been sampled and have been entered into buffer B1 as either detail words or compressed words, represented by words W1, W2 . . . W*n*. The scanning unit then makes a second horizontal scan of a different area of the document 1. In FIG. 7*a*, an assumed example of the bits obtained by the second line scan are shown. Here, the frames are designated $F(n+1)$, $F(n+2)$ . . . $F(2n)$.

It will be noted that the first two frames $F(n+1)$, $F(n+2)$ contain detail since a change of state occurs within these frames. However, after these two frames, there is a succession of 2040 "1" bits, over which there is no change of state. The bits representing the first frame $F(n+1)$ of this scan will be entered into the eight position shift register 102, as mentioned previously. Since these bits represent detail, they will be gated directly into the data register 104. Also, since this is the first frame of the second horizontal line scan, a "1" bit will be entered into bit position 110. However, "1" bits will not be entered into either bit position 112 or bit position 114.

Since the second frame $F(n+2)$ of this scan is also detailed, these bits will be entered into the eight position shift register and directly gated into the data register 104. In this case a "1" bit will not be entered into a bit position 110, since this frame does not represent the start of a line scan. Since the bits are not redundant, a "0" bit will be entered into bit position 112. A "0" bit will also be entered into bit position 114, since the word in register 104 is a detail word.

The next 2040 bits are all "1's" and therefore will be continuously entered into the eight position shift register 102 as mentioned previously with frame F3 of the first horizontal line scan. Dut to this redundancy, there will be no output from the change-of-state trigger T1 and hence pulses will be continuously applied to the $2^7$ counter 106. The eight count decoder 128 will continuously count eight bits and will provide an input to AND gate 138. After all 2040 bits have been entered into the eight position shift register 102, the $2^7$ counter 106 will be decoded and an output will appear from OR gate 144, which output will open gates 140. This will transfer the contents of the counter 106 to the data register 104. In this case a "1" bit will not be applied to bit position 110 of data register 104 as frame $F(n+3)$ is not the start of a line scan. However, since this frame will be represented by a compressed word, a "1" bit will be entered into bit position 112 in the manner set forth previously in the discussion concerning frame F3 of horizontal line scan 1. Since the bits are all "1's," a "1" bit will be entered into bit position 114, as explained previously with respect to frame F3. This 11-bit, compressed word is then entered as a word $W(n+3)$ in the third word position of the second row of the memory plane of buffer B1 (FIG. 7*b*). The remaining compressed or detail words that are made up from the bits of the second horizontal line scan (frames $F(n+)$, $F(n+)$ . . . $F(2n)$ are entered into the remaining word positions of the second row of the memory plane of buffer B1. After all sampling of the bits in horizontal line scan 2 is complete, the document is scanned in a third line and the bits are sampled as before.

Since the bits obtained from the third horizontal line scan contain a change of state within the first eight bits, the frame $F(2n+1)$ will be eight bits long, and these bits will be gated directly from the eight position shift register 102 to the data register 104. As before a "1" bit will be supplied in bit position 110 indicating that this is the start of a new line scan. The word contained in data register 104 will be entered in the first word position of row 3 of buffer B1 as word $W(2n+1)$.

The second frame $F(2n+2)$ of bits in horizontal line scan 3 contain no change of state over 8 bits and accordingly there will be no output from the change of state trigger T1 when these bits are loaded into the eight position shift register 102. However, when the eight count register 108 is decoded, a reset signal will be applied to the change-of-state trigger T1. This will cause a positive output from this trigger which output will be applied on line 133 to AND gate 130 and also to OR gate 146. The output of OR gate 146 will be applied as an input to OR gate 144 whose output G will open the gate 140. Since there was no change of state within frame $F(2n+2)$, two inputs would be present at AND gate 138 and, accordingly, the $2^7$ counter 106 would be stepped once. When the gates 140 are opened, the contents of counter 106 will be applied to data register 104 as a compressed word.

There is no need to apply a "1" bit to bit position 110 as frame $F(2n+2)$ is not the start of a line scan. However, a "1" bit is entered into bit position 112 to indicate that it is a compressed word. A "0" bit is entered into bit position 114 to indicate that the compressed word is comprised of only "0's."

This compressed word is entered into the second word position of the third row of the memory plane of buffer B1, as word $W$ $(2n+2)$.

The fourth horizontal line scan of the original document has yielded sixteen "0's." In the manner previously mentioned, the redundancy existing will be entered into the $2^7$ counter 106 and a compressed word will be gated from this counter into the data register. This compressed word will be entered into the first word position of row 4 of the memory plane of buffer B1, as word $W(3n+1)$. The remaining words, both detail and compressed, representing the data obtained in horizontal line scan 4 are entered in the remaining word positions of the fourth row of buffer B1.

Referring to FIG. 7*b*, the totality of words W1, W2 . . . W*n* . . . W2*n* . . . W3*n* . . . which are stored in buffer B1, represents a pseudo-image of the original document. It is a pseudo-image in that the arrangement of data in this buffer may be random, provided that when the data is read out, the read-out will consist of corresponding portions of adjacent lines of the original document. In scanning buffer B1, the words will be read out as described with respect to FIG. 6. That is, the words in the first column will be compared to one another in order to eliminate vertical redundancy existing within this column. On the second scan of buffer B1, the words in the second column of this buffer will be compared so as to reduce vertical redundancy existing in that column. Upon completion of that scan, the third column of buffer B1 will be scanned in order to reduce redundancy which exists in that column. This process continues until the entire buffer has been sampled and compared for vertical redundancy.

In the particular example chosen, read-out of the data contained in buffer B1 will be initiated after seven lines of horizontal scan have been completed. The memory address register (MAR) decode 178 will provide an output M which is used to trigger transfer of the contents to the second buffer B2 during a write cycle of information into buffer B1.

The vertical compression unit compares corresponding portions of adjacent horizontal line scans to determine if vertical redundancy is present. As with the horizontal compression unit, a type of run-length encodement scheme is utilized for this comparison. That is, if the words representing corresponding portions of adjacent horizontal lines are not the same, detail words will be entered directly into the vertical compression register 204. If the words in buffer B1 representing corresponding portions of horizontal line scans are the same, a count will be kept of the number of times this redundancy appears. In this case a compressed word, indicating the amount of redundancy, will be entered into the vertical compression register.

Referring to FIG. 5, the word W1 in the first word position of row one of buffer B1 will be gated into the buffer output register 202. A test signal will appear on line 216, and will be an input to AND gate 214. Since no comparison is to be made, there will be no output from the 41-way AND circuit 210. This will cause a positive output from the inverter 212. Consequently, a signal will appear on line 213 to open the gates 206, thus transferring the contents (word W1) of buffer output register 202 into the comparison register 208.

While the first word W1 is being transferred to the comparison register 208, the second word in the first column of buffer B1, $W(n+1)$, will be transferred to the buffer output register 202. At this time a test signal will appear on line 216 as an input to the 41-way AND circuit 210. Since word W1 is identical to word $W(n+1)$ all inputs to the 41-way AND circuit 210 will be present, thus causing a positive output to be transferred on line 215 to the seven count register 222. Since there is a positive output of the AND circuit 210, a positive output will not appear from the inverter circuit 212. The decoder 224 will provide an input to the OR circuit 218, which will provide a signal on line 213 to open the gates 206, 220. Consequently, the word contained in the buffer output register will be transferred into the vertical compression register 204.

Another word $W(2n+1)$ will be entered into the buffer output register 202, and will be compared to the previous word $W(n+1)$. Since these words are not the same, no output will appear from the 41-way AND circuit 210. This will mean that a positive output will be produced by the inverter 212 and a signal will appear on line 213, thus opening gates 206, 220.

The output from OR circuit 218 has also opened the gates 226, thus placing the contents of the seven count register 222 into vertical compression register 204 at bit positions 228, 230, 232. Since only two words, W1 and $W(n+1)$ are identical, a "1" bit will appear only in bit position 230. Thus the word contained in vertical compression register 204 will be a compressed word indicating that the first two words in the first column of buffer B1 are identical.

The seven count register 222 is reset by the output of the OR circuit 218, which output is applied through a delay 234 to the seven count register 222. The amount of delay is approximately one microsecond, as explained previously. Since the next word in Column 1 of buffer B1, $W(2n+1)$, is not identical to the previous two words in this column, there will be no positive comparison and, consequently, no output will result from the AND circuit 210. This will mean that an output will appear from OR circuit 218, which output will open the gates 206, 220. This will cause the contents of the comparison register 208 to be transferred to the vertical compression register 204. Since there is no positive comparison, the word $W(2n+1)$ will be entered as a detail word W'2 into the second word position of the first row of buffer B2.

A compression word W'1, indicating that words W1 and $W(n+1)$ are identical, was entered into the first word position of the first row of buffer B2. Since word $W(2n+1)$ is not the same as the previous two words, it has been entered as a detail word W'2 in the second word position of the first row or buffer B2. Since the fourth word in the first column of buffer B1, $W(3n+1)$, is not identical to the previous word, $W(2n+1)$, this fourth word will be entered as a detail word W'3 in the third word position of the first row of buffer B2. After seven words of the first vertical column of buffer B1 have been scanned, the words in the second column of buffer B1 are scanned and compared to establish any redundancy existing in the second column.

In the example shown in FIG. 7, none of the words W2, $W(n+2)$, $W(2n+2)$ are identical. Therefore, these words will be entered as detail words $W'(n+1)$, $W'(n+2)$, and $W'(n+3)$ respectively, in the respective word positions of row two of buffer B2. After the scan of the second column of buffer B2 is complete, the words in the third vertical column of buffer B1 will be examined. Since word W3 and word $W(n+3)$ are identical, they will be compared in the vertical compression unit, in the manner stated previously, and a compression word $W'(2n+1)$ will be entered in the first word position of the third row of buffer B2. This scanning of the contents of buffer B1 will continue until all vertical columns therein have been sampled and compared in order to reduce any redundancy which may exist with the columns. In the particular embodiment shown, up to seven words of a column can be compared for redundancy, although this amount is variable depending on the size of the counting register 222.

In the specific example shown in FIG. 7*a*, bits corresponding to portions of four horizontal line scans of the original document are entered into the subject data compressor and are examined in order to first reduce the horizontal redundancy and then to reduce the vertical redundancy which exists in the original document. It is important to remember that the bits corresponding to each horizontal line scan are compared in bit-by-bit sequence in order to generate both detail and compressed words, which compressed words are representative of the redundancy which existed between the bits of each horizontal line scan. After the words corresponding to a fixed number of horizontal line scans have been entered into buffer B1 as a pseudo-image of the original document, a signal will appear to start the read-out of this buffer in order to determine vertical redundancy. At the same time, new information can be written into buffer B1. Instead of scanning buffer B1 in a horizontal direction, its contents are scanned in a vertical direction, column-by-column, in order to eliminate redundancy which might exist between adjacent words in a vertical column. After the contents of buffer B1 have been compared, further detail or compressed words, now indicative of an overall compression, are obtained. These words can be either transmitted directly or entered into the second buffer B2, as shown in FIG. 7.

While the invention has been particularly shown and described with reference to a preferred embodiment thereof, it will be understood by those skilled in the art that other changes in form and details may be made therein without departing from the spirit and scope of the invention.

What is claimed is:

1. An apparatus for two dimensional compression of binary data, comprising, in combination:

first scanning means for scanning a document or picture in a first direction;

first compression means for compressing in said first direction, data obtained from the output of said first scanning means, to eliminate redundancy existing in said data in said first direction, said first compression means providing an output representative of the information on said document or picture;

second scanning means for scanning, in a second direction, said output of said first compression means;

second compression means for compressing the output from said second scanning means, whereby the output of said second compression means is twice compressed data, representative of the information on said docement or picture.

2. The apparatus of claim 1, wherein said first compression means comprises a storage means for storing data representing a pseudo-image of said document or picture, for arrangement of data prior to readout into the second compression means.

3. The apparatus of claim 1, wherein the first and second compression means are first and second run-length encoders respectively, said first run-length encoder compressing data on a bit-by-bit basis and said second run-length encoder compressing data on a word-by-word basis.

4. The apparatus of claim 1, further including a storage means for storing said twice compressed data, which data can be transmitted from said storage means at any convenient time.

5. An apparatus for two dimensional compression of binary data, said data being obtained by scanning a document or picture in a first direction comprising, in combination:

a first run-length encoder for compressing said data in said first direction, said compression being on a bit-by-bit basis;

storage means for storing said compressed data, the contents of said storage representing a pseudo-image of said document or picture;

a second run-length encoder for compressing the contents of said storage means in a second direction, said second compression being on a word-by-word basis;

data collection means for receiving the contents of said second run-length encoder, the data in said data collection means being twice compressed data representing the information on said document or picture, wherein the redundancy existing in said information in both said first and second directions is reduced.

6. The apparatus of claim 5, including a first control means for controlling both said first run-length encoder and said storage means and a second control means for controlling said second run-length encoder, wherein the first control means regulates the flow of data through said first run-length encoder and storage means and said second control means regulates the flow of data from said first run-length encoder to said second run-length encoder, the operational speed of said first control means being less than the speed of said second control means.

7. The apparatus of claim 5, including a second storage means for storing said twice compressed data, which data can be transmitted from said second storage means at any convenient time.

8. An apparatus for two dimensional compression of binary data, said data being obtained by scanning a document or picture in a first direction, comprising, in combination:

a run-length encoder for compressing said data in said first direction, said compression being on a bit-by-bit basis, and for providing a data output;

storage means for storing the output of said run-length encoder for arrangement of said compressed data to represent a pseudo-image of said document or picture;

first control means for controlling said first run-length encoder and said first storage means for regulating the flow of data therebetween;

first data collection means for receiving the contents of said first storage means in word-by-word fashion, effecting scans of said document or picture in a second direction, and for providing a sequential output of said words;

a compare unit for comparing successive words received from said first data collection means and for providing an output representative of the identity or non-identity of said words, which output is data that has been compressed in both said first and second directions;

second data collection means for receiving the output of said compare unit;

second control means for controlling said compare unit and said first and second data collection means and regulating the flow of data therebetween;

second storage means for storing said twice compressed data, which data can be transmitted from said second storage means at any convenient time.

9. An apparatus for two dimensional compression of binary data bits, said data being obtained by scanning a document or picture in a first direction, comprising, in combination:

sampling means for sampling successive frames of input data bits which are obtained by scanning said document or picture in said first direction, each frame having an arbitrary minimum bit length determined by the amount of detail in said document, and an arbitrary maximum bit length, said sampling means providing an output consisting of the input bits that are sampled, said output appearing when there is a change of state of input data bits within a minimum length frame;

first compression means for compressing said input data in said first direction if said input data bits are identical over at least one minimum length frame, said first compression means providing an output which is the number of minimum length frames of input data bits that are identical;

storage means for storing a pseudo-image of said document or picture, said pseudo-image comprising first outputs from said sampling means and second outputs from said first compression means, said first outputs being detail words occurring when there is a change of state of input data within a minimum length frame, and said second outputs being compressed words occurring when there is no change of state of input data over a plurality of minimum length frames;

first data collection means for receiving the contents of said storage means in word-by-word fashion, such that successive words received by said first data collection means are data words representing positionally corresponding portions of information obtained by adjacent line scans of said document or picture in said first direction, thus effecting scans of said document or picture in a second direction;

second data collection means for receiving words in sequence from said first data collection means;

comparison means for comparing the words contained in said first and second data collection means, said comparison means providing an output only when said compared words are identical;

second compression means responsive to the output of said comparison means, the contents of said second compression means being representative of the number of successive words from said storage means that are identical;

third data collection means for receiving the output from said second data collection means and the output from said second compression means, wherein the combinations of these outputs in said third data collection means are words which represent the information in said document or picture and which are compressed in both said first and second directions.

10. The apparatus of claim 9, including a second storage means for storing said twice compressed data from said third data collection means, which data can be transmitted from said storage means at any convenient time.

11. The apparatus of claim 9, including tag bit circuitry for providing various information bits which label the output words from both said sampling means and said first compression means.

12. The apparatus of claim 11, including control means responsive to the outputs of said tag bit circuitry for controlling the entry of data into said first storage means from said sampling means and said first compression means.

13. An apparatus for the two dimensional compression of binary data bits, said data being obtained by scanning a document or picture in a first direction, comprising, in combination:

input comparison means for comparing adjacent bits of input data and for generating an output when said adjacent bits are different;

sampling means for sampling successive frames of input data bits which are obtained by scanning said document or picture in said first direction, each frame having an arbitrary minimum bit length determined by the amount of detail in said document, and an arbitrary maximum bit length, said sampling means providing an output consisting of the input bits that are sampled, said output appearing when there is a change of state of input data bits within a minimum length frame;

first compression means for compressing said input data in said first direction if the input data bits are identical over at least one minimum length frame, said first compression means providing an output which is the number of minimum length frames of input data bits that are identical;

storage means for storing a pseudo-image of said document or picture, said pseudo-image comprising first outputs from said sampling means and second outputs from said first compression means, said first outputs being detail words occurring when there is a change of state of input data within a minimum length frame, and said second outputs being compressed words occurring when there is no change of state of input data over a plurality of minimum length frames;

first data collection means for receiving the contents of said storage means in word-by-word fashion, such that successive words received by said first data collection means are words representing positionally corresponding portions of information obtained by adjacent line scans of said document or picture in said first direction, thus effecting scans of said document or picture in a second direction;

second data collection means for receiving words in sequence from said first data colection means;

circuitry for generating an output test pulse after readout of each word from said storage means;

comparison means for comparing the words contained in said first and second data collection means upon the incidence of said output test pulses, said comparison means providing an output only when said compared words are identical;

second compression means responsive to the output of said comparison means, the contents of said second compression means being representative of the number of successive words from said storage means that are identical;

third data collection means for receiving the output from said second data collection means and the output from said second compression means, wherein the combinations of these outputs in said third data collection means are words which represent the information on said document or picture and which are compressed in both said first and second directions.

14. The apparatus of claim 13, wherein said input comparison means includes circuit means for generating a change-of-state waveform indicative of the level of video data received when said document or picture is scanned in said first direction, and bistable means for providing an output when there is no change of state of said video data.

15. The apparatus of claim 13, including a second storage means for storing said twice compressed data from said third data collection means, which data can be transmitted from said second storage means at any convenient time.

16. The apparatus of claim 13 including generating means responsive to the output of said input comparison means for generating pulses each time there is no change of state of input data bits throughout a frame of minimum length.

17. The apparatus of claim 13, including:

first control means for controlling the read-out and resetting of said sampling means;

generating means responsive to the coincident output of said input comparison means and an output of said control means for generating pulses each time there is no change of state of input data bits throughout a frame of minimum length;

second control means responsive to the output of said comparison means for gating out the contents of said first and second data collection means, and for gating out the contents of said second compression means.

18. The apparatus of claim 17, including second storage means for storing said twice compressed data from said third data collection means, which data can be transmitted from said second storage means at any convenient time.

19. The apparatus of claim 17, including tag bit circuitry for providing various information bits which label the output words from both said sampling means and said first compression means.

20. The apparatus of claim 17, wherein said first control means includes:

counting means for counting the number of bits in a minimum length frame and for providing an output each time this number is reached;

means for gating out the contents of said sampling means, and said second control means includes;

circuitry responsive to said comparison means for providing an output signal;

a plurality of gates, each responsive to said output signal for gating out the contents of said first and second data collection means and the contents of said second compression means.

21. The apparatus of claim 13, including first decoder means for decoding said first compression means and for gating out the contents of said first compression means, and second decoder means for decoding said second compression means, said second decoder means providing an input to said second control means.

22. The apparatus of claim 21, including a second storage means for storing said twice compressed data from said third data collection means, which data can be transmitted from said second storage means at any convenient time.

23. The apparatus of claim 21, wherein said first decoder means includes a decoding means, and means responsive to the output of said decoding means for gating out the contents of said first compression means.

24. The apparatus of claim 21, including tag bit circuitry for providing various information bits which label the output words from both said sampling means and said first compression means.

25. An apparatus for two dimensional compression of binary data bits, said data being obtained by scanning a document or picture in a first direction, comprising, in combination:

input comparison means for comparing adjacent bits and for generating an output when said adjacent bits are different;

sampling means for sampling successive frames of input data bits which are obtained by scanning said document or picture in said first direction, each frame having an arbitrary minimum bit length determined by the amount of detail in said document, and an arbitrary maximum bit length, said sampling means providing an output consisting of the input bits that are sampled, said output appearing when there is a change of state of input data bits within a minimum length frame;

first control means for controlling the readout and resetting of said sampling means;

generating means responsive to the coincident output of said input comparison means and an output of said control means for generating pulses each time there is no change of state of input data bits throughout a frame of minimum length;

first compression means responsive to said pulses for compressing said input data in said first direction, if the input data bits are identical over at least one minimum length frame, said first compression means providing an output which is the number of minimum length frames of input data bits that are identical;

first decoder means for decoding said first compression means and for gating out the contents of said first comprission means;

storage means for storing a pseudo-image of said document or picture, said pseudo-image comprising first outputs from said sampling means and second outputs from said first compression means, said first outputs being detail words occurring when there is a change of state of input data within a minimum length frame, and said second outputs being compressed words occurring when there is no change of state of input data over a plurality of minimum length frames;

first data collection means for receiving the contents of said storage means in word-by-word fashion, such that successive words received by said first data collection means are words representing positionally corresponding portions of information obtained by adjacent line scans of said document or picture in said first direction, thus effecting scans of said document or picture in a second direction;

second data collection means for receiving words in sequence from said first data collection means;

circuitry for generating an output test pulse after readout of each word from said storage means;

comparison means for comparing the words contained in said first and second data collection means upon the incidence of said output test pulses, said comparision means providing an output only when said compared words are identical;

second compression means responsive to the output of said comparison means, the contents of said second compression means being representative of the number of successive words from said storage means that are identical;

second control means responsive to the output of said comparison means for gating out the contents of said first and second data collection means, and for gating out the contents of said second compression means;

second decoder means for decoding said second compression means, said second decoder means providing an input to said second control means;

third data collection means for receiving the output from said second data collection means and the output from said second compression means, wherein the combinations of these outputs in said third data collection means are words which represent the information on said document or picture and which are compressed in both said first and second directions.

26. The apparatus of claim 25 including a second storage means, which is slower than said first storage means and which stores the twice compressed data from said third data collection means, which data can be transmitted from said second storage means at any convenient time.

27. The apparatus of claim 25 including tag bit circuitry for providing various information bits which label the output words from both said sampling means and said first compression means.

28. The apparatus of claim 26 including a first memory address register and control for controlling the entry of data into said first storage means, and a second memory address register for controlling the entry of data from third data collection means into said second storage means.

29. The apparatus of claim 25, wherein said input comparision means includes circuit means for generating a change-of-state waveform indicative of the level of video data received when said document or picture is scanned in said first direction, and bistable means for providing an output when there is no change of state of said video data.

30. The apparatus of claim 25, where said first control means includes:

counting means for counting the number of bits in a minimum length frame and for providing an output each time this number is reached;

means for gating out the contents of said sampling means, and said second control means includes;

circuitry responsive to said comparison means for providing an output signal;

a plurality of gates, each responsive to said output signal, for gating out the contents of said first and second data collection means and the contents of said second compression means.

31. The apparatus of claim 25, wherein said first decoder means includes a decoding means, and means responsive to the output of said decoding means for gating out the contents of said first compression means.

32. The apparatus of claim 25, where said first, second and third data collection means are registers, said comparison means is an AND gate, said sampling means is a shift register, and both said compression means are counters.

References Cited

UNITED STATES PATENTS

| | | | |
|---|---|---|---|
| 3,192,315 | 6/1965 | Remley. | |
| 3,347,981 | 10/1967 | Kagan et al. | 178—5 |

PAUL J. HENON, Primary Examiner

P. R. WOODS, Assistant Examiner

U.S. Cl. X.R.

178—6.8; 179—15.55